United States Patent [19]
Otani et al.

[11] Patent Number: 4,954,607
[45] Date of Patent: Sep. 4, 1990

[54] FERROMAGNETIC ORGANIC SUBSTANCE HAVING TRIARYL METHANE STRUCTURE AND PROCESS FOR MANUFACTURING THE SAME

[75] Inventors: Sugio Otani; Akira Kojima, both of Kiryu; Michiya Ota, Maebashi, all of Japan

[73] Assignee: Gunma University, Maebashi, Japan

[21] Appl. No.: 393,775

[22] Filed: Aug. 15, 1989

[30] Foreign Application Priority Data

Aug. 25, 1988 [JP]  Japan ................... 63-209522
Mar. 28, 1989 [JP]  Japan ................... 1-74097

[51] Int. Cl.$^5$ ............................ C08G 4/00
[52] U.S. Cl. ...................... 528/230; 528/242; 528/243; 528/249; 528/251; 528/253; 528/266; 528/270; 528/396; 528/481; 528/501; 528/502; 528/503
[58] Field of Search ............... 528/230, 242, 243, 249, 528/251, 253, 266, 270, 396, 481, 501, 502, 503; 525/398, 410, 414; 522/4, 6, 7, 46, 47; 264/5

[56] References Cited

U.S. PATENT DOCUMENTS

4,002,616  1/1977  Neumer .
4,346,212  8/1982  Robinson et al. ............ 528/229
4,403,089  9/1983  Buck ........................ 528/247
4,758,653  7/1988  Otani et al. ................. 528/396
4,866,157  9/1989  Otani et al. ................. 528/230

Primary Examiner—John Kight, III
Assistant Examiner—Sam A. Acquah
Attorney, Agent, or Firm—Stevens, Davis, Miller & Mosher

[57] ABSTRACT

A ferromagnetic organic substance having a triaryl methane structure and a free radical concentration of methine carbon positions of at least $10^{17}$ radicals/g, preferably at least $10^{18}$ radials/g, is provided by polycondensing a condensed polynuclear aromatic compound or an electron donating group substituted monocyclic aromatic compound with an aromatic aldehyde in the presence of an acid catalyst, to produce a precondensate having a softening point between 30° C. and 120° C. and being soluble in various organic solvents, and subjecting the resulting precondensate to a dehydrogenation treatment and a purification treatment, followed by molding. Alternatively, a preferable ferromagnetic organic substance having a triaryl methane structure is also manufactured by self-polycondensing an aromatic derivative having at least one electron donating group and at least one aldehyde group in the presence of an acid catalyst and then dehydrogenating the resulting polymer by light-irradiation and/or treatment with an oxidizing agent.

15 Claims, 2 Drawing Sheets

FIG. 1

FIG_2

FERROMAGNETIC ORGANIC SUBSTANCE HAVING TRIARYL METHANE STRUCTURE AND PROCESS FOR MANUFACTURING THE SAME

BACKGROUND OF THE INVENTION

1. Field of the Invention

The present invention relates to a ferromagnetic organic high polymeric substance of which extensive, diversified applications are expected in the molecular element field, such as magnetic recording materials, photoelectronic optical materials or the like, particularly to a precursor thereof, i.e., a precondensate having a thermosetting triaryl methane structure and a stable ferromagnetic organic substance derived therefrom. This invention is also directed to a process for manufacturing the ferromagnetic organic substance.

2. Related Art Statement

Hitherto known ferromagnetic organic substances are limited to: (1) a black powdery polymer prepared by heating or UV irradiation of 1,4-bis(2,2',6,6'-tetramethyl-4-oxy-4-piperidyl-1-oxy)butadiin [Korshak: Nature, 326, 370 (1987)]; (2) a black insoluble polymer prepared by polymerization of 1,3,5-triaminobenzene by means of iodine [Torrance: Synth. Metal, 19, 709 (1987)]; and polycarbene [Iwamura et al: J. Jpn. Chem. Soc., 4, 595 (1987)]. All of them have problems, such as a difficult synthesis with a low reproducibility, the portion to develop ferromagnetism being no more than a few percents, an extremely low temperature for developing magnetism, instability in the ambient air, or the like. Although theoretical studies of the ferromagnetism development are being actively conducted, necessary and sufficient conditions for developing the ferromagnetism in organic substances have not been established as sufficiently ferromagnetic, organic substances have not yet been synthesized.

One of the inventors and his collaborator heretofore proposed in U.S. Pat. No. 4,758,653 a condensed polynuclear aromatic hydrocarbon resin (COPNA) which was prepared from condensed polynuclear aromatic compounds, using p-xylylene glycol as a crosslinking agent. This resin is characterized by an excellent heat resistance. However, through subsequent studies wherein the crosslinking agent was changed from p-xylylene glycol to benzaldehyde or benzene dialdehyde, we, the inventors, succeeded in obtaining a thermosetting resin yet higher in heat resistance and proposed it as Japanese Patent Application No. 282,080/1987. In the course of the above studies we accidentally found the fact that the resultant hardened product or its precursor i.e. a thermosetting precondensate (B-stage resin) showed a reaction, even a little, to permanent magnets. With this finding an assiduous study was further carried out which had consequently solved all problems entailed by the aforementioned hitherto known magnetism developing organic substances and the present invention had been accomplished.

SUMMARY OF THE INVENTION

The object of the present invention is to provide a stable organic high polymeric substance or a precursor thereof, i.e., a thermosetting precondensate, which presents ferromagnetism with a good reproducibility and is readily synthesized.

Namely, the organic high polymeric substance of the present invention to achieve the above object is a ferromagnetic organic substance having a triaryl methane structure which comprises a triaryl methane basic structure represented by the general formula, wherein $R^1$ is a substituted or non-substituted, condensed polynuclear arylene group comprising at least two aromatic rings which, however, can contain a hetero atom including N, S or O as a ring member, or a phenylene group substituted with an electron donating group, $R^2$ is a substituted or non-substituted aryl group, and n is an integer of at least 3, and which is characterized in that a free radical concentration of methine carbon positions is at least $10^{17}$ radicals/g. Preferably, $R^2$ in the above formula is a substituted or non-substituted phenyl group, and more preferably, n in the above formula is at least 10 and the free radial concentration of methine carbon positions is at least $10^{18}$ radicals/g.

Further, among the above ferromagnetic organic substances having a triaryl methane structure, those having n of less than 10 are defined as a precondensate that is also referred to as B-stage resin, which have a softening point temperature between 30° C. and 120° C. and are soluble in various organic solvents. A process for manufacturing the B-stage resin according to the invention is characterized in that a substituted or non-substituted, condensed polynuclear aromatic compound comprising at least 2 aromatic rings, or a monocyclic aromatic compound, e.g., hydroxybenzene, having an electron donating group, such as hydroxyl group, a lower alkyl group, for example, methyl or ethyl group, a lower alkoxyl group, for example, methoxyl or ethoxyl group, or the like, is polycondensed with a substituted or non-substituted aromatic aldehyde in the presence of an acid catalyst in a magnetostatic field.

Furthermore, the process of the present invention for obtaining a ferromagnetic organic substance having a triaryl methane structure via such a B-stage resin is characterized in that a substituted or non-substituted, condensed polynuclear aromatic compound comprising at least 2 aromatic rings, or an electron donating group substituted benzene derivative, such as hydroxybenzene, is polycondensed with a substituted or non-substituted aromatic aldehyde in the presence of an acid catalyst to produce a precondensate having a triaryl methane structure which is soluble in various organic solvents and has a softening point temperature between 30° C. and 120° C. and then the precondensate is subjected to a dehydrogenation treatment and a purification treatment, i.e., unreacted substance removing treatment, followed by shaping. It is preferred that at least one of the two steps, i.e., the abovementioned polycondensation reaction step to produce the precondensate having a triaryl methane structure and the abovementioned shaping step, is conducted in a magnetostatic field.

BRIEF DESCRIPTION OF THE DRAWINGS

The present invention will be explained in more detail together with its function with reference to the accompanying drawings wherein.

DETAILED DESCRIPTION OF THE INVENTION

As described in detail in the aforementioned U.S. patent specification, a B-stage resin having a softening point temperature of about 30° C.~120° C. is obtained by heating an aromatic aldehyde and a condensed polynuclear aromatic compound, such as anthracene, pyrene or the like, at a temperature between 140° C. and 200° C. in the presence of an acid catalyst. This B-stage resin is further heated at a reaction temperature for a long period of time or subjected to a short time treatment at a temperature between 200° C. and 300° C., to provide a hardened product. If the aromatic compound to be crosslinked is replaced by a hydroxyl substituted derivative, for example, phenol, resorcinol, monohydroxy-naphthalene, dihydroxy-naphthalene or the like, and the crosslinking agent is benzaldehyde which is in a liquid state at room temperature, the reaction proceeds at a further lower temperature.

In these reactions the fact that the hardened product is finally obtained via the B-stage resin to which various molding processes can be applied will be very advantageous in contemplating applications. Namely, films can be manufactured by a casting process using a B-stage resin solution, or fibers or other molded articles can be manufactured using a molten B-stage resin.

As a method for most simply determining the magnetism of the B-stage resin or hardened product, the following method was adopted. Water is introduced into a glass petri dish of 10 cm diameter to a level of 1~2 mm and a powder of the B stage resin or hardened product is scattered over the water. The powder floats on the surface of the water. A permanent magnet is laid underneath the dish and left to stand. Then, the powder of the sample on the water surface gathers on the peripheral portions where the density of the magnetic flux is the highest, and is drawn up along the periphery. The time required to gather on the periphery of the magnet depends on the raw materials of the resin and the manufacturing conditions. It will be drawn up within 30 seconds at the fastest and 10 minutes or thereabouts at the slowest. Of course there will be the case of no drawing-up. After these preliminary comparisons for the magnetism, main samples are further measured for the magnetism by the Vibrating Sample Magnetometer (VSM) manufactured by Riken Electronics K.K.

As the result of an initial investigation, it has been found to be effective for developing ferromagnetism that the polycondensation reaction is conducted in a magnetic field, or using a B-stage resin having a low softening temperature which has been manufactured in advance, a further reaction is carried out in a magnetic field. More concretely, a reaction vessel is placed in the center of a coil while flowing a direct current through the coil, or the reaction vessel is placed between the both poles of a large magnet. The simplest method is that a glass pane, an aluminum foil or a releasing paper is placed on a permanent magnet, an initial B-stage resin solution is put thereon to get rid of the solvent, which, if required, is heated to effect a polycondensation reaction, and then the hardened resin is peeled off. Alternatively, the reactant is interposed between upper and lower magnets and heated.

According to this method, it has been found that a high polymer exhibiting ferromagnetism at room temperature can be obtained. However, the problem is a low yield of the ferromagnetic portions due to the fact that some portions exhibit the ferromagnetism and other portions do not. Although the reason therefor has not yet been elucidated theoretically, addition of new other treating steps has been studied on the assumption of two possibilities.

From the result of analysis mainly by NMR spectrum of molecules constituting the B-stage resin, it has been clarified that these molecules are in the form of a triaryl methane structure. From this fact the following two assumptions have been established as a possibility for improving the yield of the ferromagnetic portions.

One of them is to increase the free radical concentration by removing the hydrogen atom bonded to the methine carbon atom positioned in the center of the triaryl methane structure. The other one is to remove unreacted raw material molecules remaining in a large amount in the B-stage resin, which is referred to as a purification treatment throughout this specification.

Figure 1:
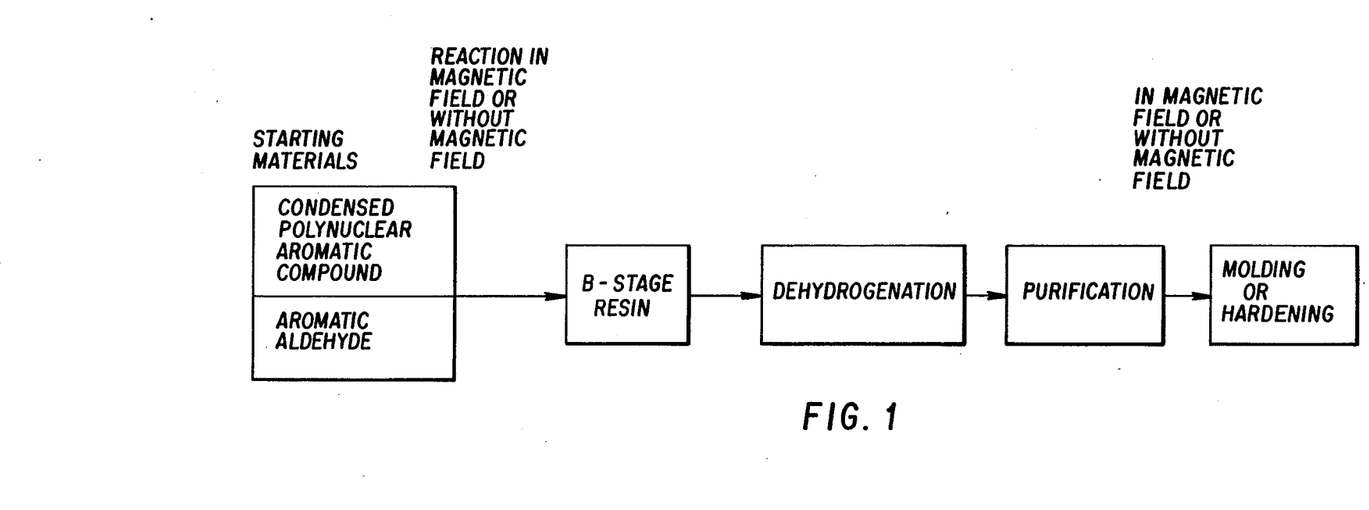
FIG. 1 is a process flow sheet of the process according to the present invention and, FIG. 2 is a graph showing a magnetization curve of a polymer according to the present invention.

Both of these two attempts have been found to be effective for improving characteristics and yields and consequently the most suitable process is as the process flow sheet shown in FIG. 1 of the appended drawings.

In this process it is no problem to exchange the order of the dehydrogenation treatment and the purification treatment. The essential thing is to comprise those two treatments.

These manufacturing processes will be explained hereinafter a little more concretely.

As a condensed polynuclear aromatic compound to be applied to the present invention, mention may be made of those having about 2~10 aromatic rings, such as a benzene ring condensed type, for example, naphthalene, anthracene, phenanthrene, pyrene, chrysene, naphthacene, benzophenanthrene, perylene, benzpyrene, coronene, or the like, which may include a 5-membered ring, such as acenaphthylene, decacyclene or the like, or which may include a hetero atom as a ring member, such as N, S, O or the like. Further, derivatives substituted with hydroxyl group, methyl group or the like also can be applied suitably. These may be used alone or in combination. Alternatively, in the case of monocyclic aromatic compounds, non-substituted benzene hardly undergoes a reaction. However, such a compound as substituted with one or two electron donating groups, such as hydroxyl group, a lower alkoxyl group, for example, methoxyl group, a lower alkyl group, for example, methyl group, ethyl group or the like, typically phenol or resorcinol, also can be employed. Among the above-mentioned condensed polynuclear aromatic compounds, inter alia, pyrene is easy to manufacture by virtue of its high reactivity. In the case of naphthalene or the like, hydroxyl substituted derivatives are high in reactivity so that the reaction proceeds at a lower temperature for a shorter time even as compared with pyrene, etc. Examples of such a derivative include naphthol, various dihydroxyl naphthalene derivatives and the like. The electron donating group substituted derivatives including monocyclic compounds have an advantage such that the site of reaction with the crosslinking agent can be predetermined by virtue of a particularly large reactivity at ortho- and para-positions oriented by the substituted group so that the resulting structure can be readily controlled. Such reactions between phenol and benzaldehyde and between resorcinol and benzaldehyde are shown in the following formulae (2) and (3), respectively.

The crosslinking agent is characterized by aromatic aldehydes or substituted derivatives thereof. As a substituent, mention may be made of nitro group, hydrogen, methyl group, isopropyl group, t-butyl group, hydroxyl group, amino group or the like. Among such aromatic aldehydes, most generally used are benzaldehyde, its methyl or nitro substituted derivatives and the like. In many cases the use of benzene dialdehyde, i.e., a di-substituted derivative, more improves the moldability of the resin.

The molar ratio of the crosslinking agent to the aromatic compound is in most cases at least 1 as shown in Examples hereinafter. The final product in this case has a three-dimensional triaryl structure.

As a catalyst, various acid catalysts, for example, beginning with p-toluenesulfonic acid, various aromatic sulfonic acids, fluoromethane sulfonic acid, other ultra strong acids, sulfonic acid, and the like, can be employed.

The reaction between an aromatic aldehyde, for example, benzaldehyde, and a condensed polynuclear aromatic compound, for example, pyrene, in the presence of an acid catalyst, proceeds in accordance with the formula (4) below. This reaction can be proved by a structure analysis of the reaction product.

Namely, the compound obtained by a reaction as above presents a resonance absorption spectrum at a position near 50 ppm of $^{13}$CNMR spectrum, showing an evident existence of a methine-bonded carbon atom. The accurate position of the absorption spectrum somewhat differs depending upon the raw materials used. For example, it appears at 54 ppm for the pyrene/benzaldehyde system and 2 positions, i.e., 47 ppm and 53 ppm, for the phenol/benzaldehyde system. The above analysis proves that the polycondensate, i.e., the above reaction product, has a structural feature of comprising a triaryl methane structural unit so that the reaction product is to be named generally as a polycondensate having a triaryl methane structure. In the case where an aromatic dialdehyde such as terephthalaldehyde is used, the reaction is basically the same and consequently yields a three-dimensional high polymer having a triaryl methane recurring structural unit.

The basic recurring unit of the polycondensate having such a triaryl methane structure may be represented by the following formula (1)

wherein $R^1$ is a substituted or non-substituted, condensed polynuclear arylene group comprising at least two aromatic rings which, however, can contain a hetero atom including N, S or O as a ring member, or a phenylene group substituted with an electron donating group, $R^2$ is a substituted or non-substituted aryl group, and n is an integer of at least 3.

It has been found through subsequent studies that when the starting materials used are an aromatic compound having an electron donating group, such as hydroxyl group, a lower alkyl group, for example, methyl or ethyl group, a lower alkoxyl group, for example, methoxyl or ethoxyl group, or the like, together with an aldehyde group, in the same aromatic nucleus a triaryl methane high polymeric compound having a basic structure as shown in the following formula (5) can be obtained by heating the above aromatic compound alone in the presence of an acid catalyst wherein $R^3$ denotes a substituted or non-substituted aromatic nucleus and n is an integer of at least 3.

The structure of the product obtained by the above reaction will be explained hereinafter by way of example of p-hydroxybenzaldehyde. The hydroxyl group is an ortho- and para-orienting group. However, in p-hydroxybenzaldehyde, since the para-position has already been occupied by the aldehyde group, substitution takes place selectively at the ortho-position. The reaction proceeds as shown in the following formul (6) that is essentially the same as that in the case of the mixture of phenol and benzaldehyde.

Since the hydroxyl group and aldehyde group exist in the same aromatic nucleus, the structural unit of the obtained triaryl methane high polymer differs and accordingly results in a different higher-dimensional structure. The detail of this higher-dimensional, reticu- lar structure has not yet been established, whereas the basic structural unit has been identified by the result of $^{13}CNMR$ and analysis of the reaction. The fundamental element for the magnetism development lies in this structural unit.

As an aromatic nucleus having two kinds of substituents, it may be either a monocyclic such as hydroxybenzaldehyde or a condensed polycyclic such as naphthalene and the like. However, when an increase of the free radical concentration per unit weight is attempted, the monocyclic is the most advantageous.

The free radical concentration calculated from the result of the measurement of the paramagnetic resonance absorption of a reaction product prepared according to a usual process under usual conditions is $10^{16} \sim 10^{17}$ radicals per gram and not always high. Even in this case a product prepared by heat-polycondensation in a magnetic field has an increased radical concentration of $10^{17} \sim 10^{18}$ radicals per gram and, in some cases of the aforementioned preliminary testing method, the powder of the product is drawn up along the periphery of a magnet within 30 seconds. Further, among sample pieces of a film prepared between a pair of magnets, some were found by VSM to exhibit magnetic anisotropy, namely, a saturation magnetization of 5.64 G and a coercive force of 100 Oe in the direction perpendicular to the film surface corresponding to the direction parallel to the magnetic field and 5.85 G and 160 Oe, respectively, in the direction parallel to the magnetic field. However, the yield of samples exhibiting such a strong magnetic characteristic is low and in most cases does not exceed a few percents.

As a dehydrogenation treatment for removing the hydrogen atom attached to the methine carbon to increase the free radical concentration, some methods have been found to be effective. One of them is a process wherein a B-stage resin is prepared using a benzaldehyde/pyrene mixture (molar ratio: 1.25) as a starting material, which is finely pulverized and suspended in a dried xylene together with equimolar dicyanodichlorobenzoquinone (DDQ), heated at the boiling temperature for 24 hours in an argon gas stream and then filtered. By removing DDQ, unreacted starting materials, etc. by extracting with tetrahydrofuran (THF) from the sample obtained according to the above process, a sample which evidently exhibits ferromagnetism is provided though the yield is so low as $1 \sim 3\%$. As another dehydrogenation treatment to yield more magnetic products, the following method is also effective. Namely, the abovementioned B-stage resin is dissolved in chloroform and equimolar benzoquinone (BQ)is added as a photosensitizer. Then, using a high pressure mercury arc lamp, an ultra-violet ray of 370 nm is irradiated to this solution for 1 hour or more. According to this method, the solution after the above treatment is poured into methyl alcohol to precipitate only the reaction product. Thus, a ferromagnetic organic substance can be obtained in a yield as high as about $70 \sim 85\%$. This product still has a softening point temperature of 80° C. or thereabouts, so that it is possible to apply various molding processes to this product, and also to conduct a further polycondensation reaction.

Another more interesting dehydrogenation treatment has been found. It is to electrically discharge on the B-stage resin placed in a condenser. According to this method, the magnetism is clearly augmented. This method has a future possibility to become a very important means as a method to provide a film sample piece with a local magnetism.

In short, the dehydrogenation treatment does not have to limit its method particularly and any of conventional processes are effective wherein not only BQ and DDQ but also many photosensitizer, such as benzophenone, azobisisobutyronitrile (AIBN), or the like, can be used, and UV irradiation, laser radiation, an electric treatment by means of discharge, or the like, will further promote the effect.

By such a dehydrogenation treatment, the free radical concentration increases up to about $10^{19} \sim 10^{21}$ radicals per gram.

The combined application of the dehydrogenation treatment and the purification treatment, i.e., unreacted material removing treatment, can improve yields of the magnetic organic substance. However, when applications of this substance are contemplated, effective molding processes become required. Fortunately, in most cases the B-stage resin is heat-softened or melted, or dissolves in a solvent. Accordingly, it can be molded by a hot-press molding process or a casting process and then a hardening of the molded products proceeds by further heating. Utilizing the above properties, molding into various shapes can be effected. In this case, that the molding process conducted in a magnetostatic field results in a higher improvement of magnetism is the same as that already described hereinbefore regarding the samples not subjected to the dehydrogenation treatment. However, by using a dehydrogenation-treated B-stage resin, the magnetism and yield of the molded samples increase conspicuously as compared with the case of using a B-stage resin not subjected to the dehydrogenation treatment.

Various molded articles can be manufactured as described above. However, it has been recognized that the feasibility of molding depends upon the combination of the aromatic compound with the crosslinking agent. For example, a combination of benzene, naphthalene or the like, substituted with two electron donating groups, for example, dihydroxyl group substituted derivatives, as an aromatic compound, with benzaldehyde as a crosslinking agent, is most suitable for providing film-like sample pieces. Alternatively, the combination of pyrene with benzene dialdehyde is most suitable for bulky molded articles. Further, for manufacturing fibrous molded articles, the precondensate, i.e., the B-stage resin, is desirable. In order to further improve the moldability, incorporation of an appropriate amount of p-xylylene glycol or its methyl derivatives to the B-stage resin is also an effective method.

The color of the product varies depending upon the kind of the raw material composition as well as the stage of the progress of the reaction. In the case of the combination of an electron donating group disubstituted derivative, such as dihydroxyl group substituted benzene or naphthalene derivative, or the like, with benzaldehyde, a transparent, pale red color is deepened as the reaction proceeds. In the case of the combination of pyrene with benzaldehyde or terephthalaldehyde, a yellowish green color is gradually deepened and finally turns to black.

The B-stage resin generally has an average molecular weight such as that of approximately four linked aromatic nuclei and contains residual unreacted aldehyde groups. However, hardened products obtained by heating at 200° C. or more contain no aldehyde groups and comprise only methine groups. The magnetism develops on any stages.

The mechanism of developing the magnetism has not yet been elucidated. However, what can be identified even at present is: (1) high polymeric compounds having a specified triaryl methane structural unit develop ferromagnetism, (2) high polymers having such a structure can be obtained either by a reaction of an electron donating group substituted derivative of a condensed polynuclear aromatic compound or benzene with an aromatic aldehyde or by self-polymerization of an aromatic compound having an electron donating group and aldehyde group in the same aromatic nucleus, (3) the dehydrogenation treatment and purification treatment, i.e., unreacted material removing treatment, improve characteristics and yields, and (4) either the molding or the reaction, conducted in a magnetic field, promotes the magnetism development.

The present invention will be explained in more detail hereinafter by way of example. However, the examples are not intended to limit the scope of the invention.

EXAMPLE 1

Figure 2:
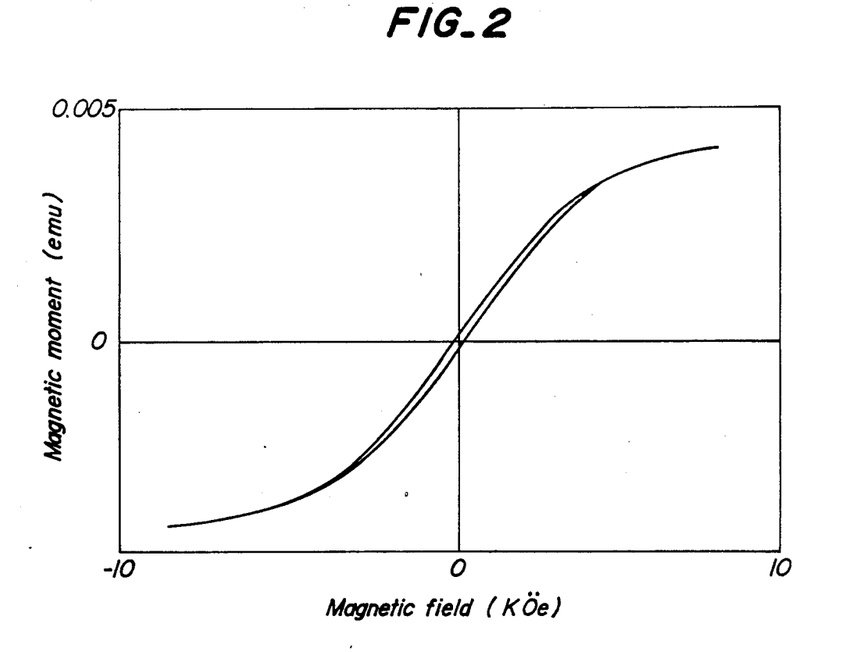

A mixture of benzaldehyde and pyrene in a molar ratio of 1.25 was admixed with 5% by weight of para-toluene sulfonic acid (PTS) and mixed well. The mixture was reacted at 160° C. for 60 minutes while agitating in an argon gas stream to produce a B-stage resin having a softening point temperature of about 80° C. and being soluble in various solvents. A small piece of this resin interposed between two sheets of aluminum foil was further interposed between two mutually facing permanent magnets (H18B, manufactured by Hitachi Metals, Ltd.) which were arranged above and below, and then heated at a temperature increase rate of 5° C./min. up to 160° C. to produce a film-like sample about 0.7 mm thick. The sample was broken into fragments of several square millimeters when peeled off. However, a fragment among others was found to exhibit magnetism. With regard to this fragment, the magnetization curve showing a hysteresis loop shown in FIG. 2 was obtained by VSM manufactured by Riken Electronics K.K. The saturation magnetizations found from this result were 5.64 G in the perpendicular direction to the surface of the film and 5.84 G in the parallel direction thereto, and the coercive forces were 100 Oe and 160 Oe, respectively. However, the yield of the ferromagnetic fragments was a few percents.

EXAMPLE 2

A mixture of terephthalaldehyde and pyrene in a molar ratio of 1.25 was admixed with 5% by weight of PTS. The mixture was heated at 160° C. for 1 hour in an argon gas stream to produce a B-stage resin. Then, using an electromagnet (Model JM-393, manufactured by Japan Electron Optics Laboratory Co., Ltd.), a magnetostatic field of 1.5 T was produced. In this field a heating apparatus comprising a glass tube of 1 cm diameter around which was wound a non-inductive heating coil was placed. A glass boat accommodating the B stage resin was inserted into the glass tube. Heating was conducted at 160° C. for 1 hour in an argon gas stream and a dark green molded article was obtained. The free radical concentration of this article was determined by ESR to be $10^{18}$ radicals/g. The saturation magnetization of this article was 0.11 Oe and the coercive force could not be obtained with accuracy.

EXAMPLE 3

A mixture of benzaldehyde and pyrene in a molar ratio of 1.25 was admixed with 5% by weight of PTS. The mixture was heated at 160° C. for 90 minutes in an argon gas stream to produce a B-stage resin. A powder of this resin was introduced into a petri dish that had received in advance 3% hydrogen peroxide aqueous solution to a level of 2 mm. Two copper wires spaced 1~2 mm apart were placed on the petri dish and a voltage of 500 V was applied thereto utilizing a constant-voltage, direct-current power supply. Then, the resin powder was drawn up successively from those nearer the poles towards the midway between the poles, where an electric discharge took place and then, simultaneously, the powder moved away rapidly off the midway as floating on the surface of the water. Thus the powder was treated successively, then separated by filtration and washed with water, followed by drying.

The obtained powder was scattered over the surface of the water on a level of about 1 mm in a petri dish of 10 cm diameter. A magnet was laid underneath the petri dish and then the powder was drawn up along the periphery of the magnet.

EXAMPLE 4

A mixture of benzaldehyde and pyrene in a molar ratio of 1.25 was admixed with 5% by weight of PTS and mixed well. The resultant mixture was reacted at 160° C. for 60 minutes in an argon gas stream to produce 1.5 g of B-stage resin having a softening point temperature of 80° C. This resin was dissolved in 25 ml chloroform, admixed with about 1.5 g benzoquinone and UV-irradiated for 12 hours with a high pressure mercury arc lamp. This solution was poured into about 50 ml methanol and the formed precipitate was separated by filtration. White precipitate was obtained in about 80% yield. The free radical concentration was determined by EST to be $10^{19} \sim 10^{20}$ radicals/g. The magnetism was determined by VSM. The saturation magnetization was 0.11 G and the coercive force was 64 Oe.

EXAMPLE 5

A magnetostatic field of 1.5 T was produced using an electromagnet (Model JM-393, manufactured by Japan Electron Optics Laboratory Co., Ltd.). A heating apparatus comprising a glass tube of 1 cm I.D. around which was wound a non-inductive heating coil was placed in the magnetostatic field. A glass boat accommodating 0.8 g white precipitate obtained in Example 4 was inserted into the glass tube and heated at a temperature increase rate of 5° C./min. up to 160° C. in an argon gas stream, which temperature was maintained for 2 hours. Then, the temperature was raised again at a temperature increase rate of 5° C./min. up to 250° C., while an each temperature at every 10° C. up was held for 10 min. Thus, a dark green solid resin sample having a free radical concentration of $10^{20}$ radicals/g was obtained.

Some pieces of this sample were scattered over the surface of the water on a level of about 1 mm in a petri dish of 10 cm diameter. A magnet (H18B) was laid underneath the petri dish and then after a while the powder was drawn up along the periphery of the magnet. After having once become to gather towards the periphery, they gathered again immediately even after the water was shaken to disperse the pieces. According to the magnetism measurement of this sample, the saturation magnetization was 5.0 G and the coercive force was 200 Oe.

EXAMPLE 6

Carbazole was admixed with 1.25 time molar amount of benzaldehyde and 5% based on the total weight of the above two materials of PTS and mixed thoroughly. Then, the mixture was transferred into a test tube with side arm and heated at 160° C. for 5~10 min. in an argon gas stream to produce a B-stage resin.

Three grams of this B-stage resin was dissolved in 20 ml of dichloromethane and the solution was poured into 60 ml of methanol. Since only the reaction product precipitated, the precipitate was separated by filtration and then the acid catalyst and unreacted materials were removed.

The obtained resin was put into a test tube and admixed with 1.5 time molar amount based on the structural unit of the reaction product of benzoquinone (BQ). Then, after adding about 10 ml of dichloromethane to the test tube to dissolve the mixture completely, the mixture solution was agitated homogeneously with ultrasonic. Using a high pressure mercury arc lamp having an output of 450 W, irradiation was conducted at room temperature for 24 hours.

The sample solution after irradiation was poured into methanol to precipitate resin. The resin precipitate was separated by filtration and transferred to a Soxhlet extractor wherein the resin was washed for 10 hours using methanol as a solvent.

A few milligrams of small pieces of the purified resin were scattered over the surface of water on a level of about 1 mm in a petri dish and a permanent magnet (H18B) was laid underneath the petri dish. Then, after 15 minutes the powder was drawn up along the periphery of the magnet where the density of the magnetic flux was the highest. After having once become to gather towards the periphery, they gathered again immediately even after the water was shaken to disperse the pieces.

EXAMPLE 7

1,6-dihydroxynaphthalene was mixed with 1.25 time molar amount of benzaldehyde. The mixture was admixed with 3% by weight of PTS and heated while agitating in a nitrogen gas stream. On the outset, after maintaining at 50° C. for 1 hour, the temperature was raised to 100° C. at which temperature heating was conducted for 1 hour and subsequently heating at 130° C. was conducted for 2 hours. A dark red, solid reaction product was obtained, which was still a highly viscous liquid at the reaction temperature.

The solid product was, after grinding, admixed with 1.5 time molar amount based on the structural unit of the reaction product of benzoguinone (BQ). The mixture was taken in a quartz test tube and about 20 ml of dichloromethane was added. The benzoquinone dissolved while the resin powder suspended. Using a high pressure mercury arc lamp of 450 W, the above solution was UV-irradiated while agitating, at room temperature for 24 hours. The sample solution after irradiation was poured into a large excess of dichloromethane and the formed precipitate was separated by filtration.

The pieces of the precipitate were scattered over the surface of the water on a level of about 1 mm in a petri dish and a magnet was laid underneath the petri dish. Then, the pieces were drawn up along the periphery of the magnet.

EXAMPLE 8

A mixture of benzaldehyde and phenol in a molar ratio of 1.25 was admixed with 1% by weight of PTS and mixed well. The resultant mixture was reacted at 130° C. for 60 minutes to produce a red B-stage resin. After grinding this resin, 1 g of the resin and about 0.5 g benzoquinone were dispersed in about 20 ml cyclohexane and UV-irradiated for 12 hours with a high pressure mercury arc lamp. After irradiation, this solution was poured into about 200 ml cyclohexane and filtered to separate a red product. The yield was about 70~80%. The result of the magnetism measurement with VSM showed that this resin had a saturation magnetization of 0.2 G and a coercive force of 90 Oe.

EXAMPLE 9

Hydroxybenzaldehyde was admixed with 1% by weight of PTS and mixed well. The mixture was reacted at 130° C. for 20 minutes to produce a red B-stage resin. After grinding this resin, 1 g of the resin and about 0.5 g benzoquinone were dispersed in about 20 ml cyclohexane and UV-irradiated for 12 hours with a high pressure mercury arc lamp. After irradiation, this solution was poured into about 200 ml cyclohexane and the formed precipitate was separated by filtration whereby a red product was obtained. The yield was about 70~80%. The result of the magnetism measurement with VSM showed that this resin had a saturation magnetization of 0.5 G and a coercive force of 10 Oe.

As demonstrated above, the present invention provides ferromagnetic high polymers that exist with stability in the air, can be synthesized with a good reproducibility and are moldable into various shapes, such as film, fiber, and the like. The advent of this invention allows a new field of application as a molecular element of magnetic recording materials, photoelectronic optical materials, etc. to be exploited.

What is claimed is:

1. A ferromagnetic organic substance having a triaryl methane structure which comprises a triaryl methane basic structural unit represented by the general formula, wherein $R^1$ is a substituted or non-substituted, condensed polynuclear arylene group comprising at least two aromatic rings which, however, can contain a hetero atom including N, S or O as a ring member, or a phenylene group substituted with an electron donating group, $R^2$ is a substituted or non-substituted aryl group, and n is an integer of at least 3, and which is characterized in that a free radical concentration of methine carbon positions is at least $10^{17}$ radicals/g.

2. The substance claimed in claim 1, wherein $R^2$ in the general formula is a substituted or non-substituted phenyl group.

3. The substance claimed in claim 1, wherein n in the general formula is at least 10 and the free radical concentration of methine carbon position is at least $10^{18}$ radicals/g.

4. A process for manufacturing a ferromagnetic organic substance precondensate having a triaryl methane structure, having a softening point temperature between 30° C. and 120° C. and being soluble in various organic solvents, which comprises polycondensing a substituted or non-substituted, condensed polynuclear aromatic compound comprising at least 2 aromatic rings, or an electron donating group substituted monocyclic aromatic compound, with a substituted or non-substituted aromatic aldehyde in the presence of an acid catalyst in a magnetostatic field.

5. A process for manufacturing a ferromagnetic organic high polymeric substance having a triaryl methane structure, which comprises the steps of:
   (1) polycondensing a substituted or non-substituted, condensed polynuclear aromatic compound comprising at least 2 aromatic rings, or an electron donating group substituted monocyclic aromatic compound, with a substituted or non-substituted aromatic aldehyde in the presence of an acid catalyst to thereby produce a precondensate having a triaryl methane structure, having a softening point temperature between 30° C. and 120° C. and being soluble in various organic solvents;
   (2) subjecting the resulting precondensate to a dehydrogenation treatment and a purification treatment to remove unreacted materials; and
   (3) molding the above treated precondensate.

6. The process claimed in claim 5, wherein at least one of the steps (1) and (3) is conducted in a magnetostatic field.

7. The process claimed in claim 6, wherein said step (1) is conducted in a magnetostatic field of at least 100 G and which process further comprises the step of further promoting the polycondensation reaction by any one of the following steps conducted between the step (1) and step (3):
   (a) the step of evaporation solvent in a solution of said precondensate having a triaryl methane structure;
   (b) the step of melting said precondensate having a triaryl methane structure;
   (c) the step of further heating at a temperature of at least 120° C. after said step (a) or (b).

8. The process claimed in claim 7, wherein said magnetostatic field has an intensity of magnetism of at least 400 G.

9. The process claimed in claim 5, wherein said dehydrogenation treatment comprises adding at least one photosensitizer selected from the group consisting of benzoquinone, benzophenone, dicyano-dichlorobenzoquinone and azobisisobutyronitrile to a solution of said precondensate having a triaryl methane structure, followed by heating, or ultraviolet ray irradiation.

10. The process claimed in claim 5, wherein said dehydrogenation treatment is conducted by utilizing an electric discharge.

11. The process claimed in claim 4 or 5, wherein said aromatic aldehyde is benzaldehyde, benzene dialdehyde or a derivative thereof.

12. A ferromagnetic organic substance having a triaryl methane structure which comprises a triary methane basic structural unit represented by the general formula, wherein $R^3$ is a substituted or non-substituted, aromatic nucleus and n is an integer of at least 3, and which is characterized in that a free radical concentration of methine carbon positions is at least $10^{17}$ radicals/g.

13. The substance claimed in claim 11, wherein $R^3$ is an electron donating group substituted aromatic nucleus, n is at least 10 and said free radical concentration of methine carbon positions is at least $10^{18}$ radicals/g.

14. A process for manufacturing a ferromagnetic organic substance comprising a triaryl methane basic structural unit represented by the general formula, wherein $R^3$ is a substituted or non-substituted, aromatic nucleus and n is an integer of at least 3, and having a free radical concentration of methine carbon positions is at least $10^{18}$ radicals/g, which process comprises heating an aromatic derivative having at least one electron donating group and at least one aldehyde group in the presence of an acid catalyst to effect a self-polycondensation reaction and then dehydrogenating the resulting polymer by light-irradiation and/or treatment with an oxidizing agent.

15. The process claimed in claim 14, wherein said aromatic derivative is para- or meta-hydroxybenzaldehyde and said light-irradiation is conducted under the existence of at least one oxidizing agent selected from the group consisting of benzoquinone, benzophenone, dicyano-dichlorobenzoquinone and azobisisobutyronitrile.

* * * * *